(12) United States Patent
Chiu et al.

(10) Patent No.: US 8,067,489 B2
(45) Date of Patent: Nov. 29, 2011

(54) POLYMER BLEND NANOCOMPOSITES USING NANOCOMPATIBILIZER AND METHOD OF MANUFACTURE THEREOF

(75) Inventors: Fang-Chyou Chiu, Tao-Yuan (TW); Sun-Mou Lai, Taichung (TW); Kai-Tse Ti, Sijhih (TW)

(73) Assignee: Chang Gung University (TW)

( * ) Notice: Subject to any disclaimer, the term of this patent is extended or adjusted under 35 U.S.C. 154(b) by 709 days.

(21) Appl. No.: 12/153,200

(22) Filed: May 15, 2008

(65) Prior Publication Data

US 2009/0036589 A1     Feb. 5, 2009

(30) Foreign Application Priority Data

Aug. 1, 2007   (TW) ............................... 96128150 A

(51) Int. Cl.
*C08K 3/34* (2006.01)
*C08K 9/04* (2006.01)
*C08K 9/06* (2006.01)

(52) U.S. Cl. ............................ 524/47; 524/445; 524/565
(58) Field of Classification Search ................... 524/47, 524/445, 565
See application file for complete search history.

(56) References Cited

U.S. PATENT DOCUMENTS

2006/0122312 A1* 6/2006 Kim et al. .................... 524/445
* cited by examiner

*Primary Examiner* — Kelechi Egwim
(74) *Attorney, Agent, or Firm* — Bacon & Thomas, PLLC

(57) ABSTRACT

The invention for the nanocompatibilizer composed of a nanoclay and a compatibilizer prepared through a melt blending process is disclosed. The enhanced mechanical properties stemming from the increased compatibility for metallocene polyethylene/starch blends are attained with the addition of the nanocompatibilizer, in comparison with neat compatibilizer, which signified the role of nanocompatibilizer in the derived nanocomposites.

6 Claims, 11 Drawing Sheets

FIGURE 10

| Sample code | 05 % | 10 % | 15 % | 20 % |
|---|---|---|---|---|
| mPE (%) | 95 | 90 | 85 | 80 |
| Pristine starch (%) | 05 | 10 | 15 | 20 |
| mPE-g-MA (phr) | 10 | 10 | 10 | 10 |
| | | | | |
| Tensile strength (MPa) | 19.9±2.1 | 19.4±4.0 | 19.7±1.3 | 17.2±2.3 |
| Elongation at break (%) | 1213.9±226.1 | 1016.6±119.5 | 1049.6±45.4 | 973.6±55.4 |
| Young's modulus (MPa) | 22.0±1.8 | 21.8±1.8 | 20.3±1.2 | 19.7±1.1 |

FIGURE 11

| Sample code | 05 % | 10 % | 15 % | 20 % |
|---|---|---|---|---|
| mPE (%) | 95 | 90 | 85 | 80 |
| Pristine starch (%) | 05 | 10 | 15 | 20 |
| mPE-g-MA (phr) | 10 | 10 | 10 | 10 |
| Clay (phr) | 1 | 1 | 1 | 1 |
| Tensile strength (MPa) | 31.0±2.9 | 29.0±1.6 | 26.8±2.9 | 24.7±3.3 |
| Elongation at break (%) | 1103.3±49.9 | 1070.1±46.3 | 1021.0±54.8 | 966.3±56.9 |
| Young's modulus (MPa) | 34.2±2.4 | 35.2±1.5 | 38.4±0.1 | 40.3±2.3 |

FIGURE 12

| Sample code | 05 % | 10 % | 15 % | 20 % |
|---|---|---|---|---|
| mPE (%) | 95 | 90 | 85 | 80 |
| TPS (%) | 05 | 10 | 15 | 20 |
| mPE-g-MA (phr) | 10 | 10 | 10 | 10 |
| Tensile strength (MPa) | 27.3±2.9 | 25.7±2.2 | 24.5±2.7 | 22.5±4.3 |
| Elongation at break (%) | 1377.1±163.2 | 1392.8±175.2 | 1318.4±106.0 | 1278.9±177.2 |
| Young's modulus (MPa) | 23.3±0.8 | 22.6±1.4 | 23.4±0.9 | 23.5±0.3 |

FIGURE 13

| Sample code | 05 % | 10 % | 15 % | 20 % |
|---|---|---|---|---|
| mPE (%) | 95 | 90 | 85 | 80 |
| TPS (%) | 05 | 10 | 15 | 20 |
| mPE-g-MA (phr) | 10 | 10 | 10 | 10 |
| Clay (phr) | 1 | 1 | 1 | 1 |
| Tensile strength (MPa) | 28.4±2.3 | 30.0±1.9 | 33.2±2.2 | 29.8±0.9 |
| Elongation at break (%) | 1019.9±42.9 | 1090.7±54.6 | 1177.2±56.8 | 1130.9±26.4 |
| Young's modulus (MPa) | 31.4±1.0 | 31.5±0.6 | 32.8±0.9 | 32.9±0.6 |

POLYMER BLEND NANOCOMPOSITES USING NANOCOMPATIBILIZER AND METHOD OF MANUFACTURE THEREOF

BACKGROUND OF THE INVENTION

1. Field of the Invention

The invention relates to a method for forming composite materials, more particularly to a method for forming polymer-blend nanocomposites using a nanocompatibilizer.

2. Description of the Prior Art

Due to the rising consciousness on the environmental protection, the development of various biodegradable polymers has been received much attention by the industry in recent years, especially the biodegradable polymers applied in the packaging industry. However, the price of biodegradable polymers is usually quite high, and the mechanical properties such as tearing resistance etc. are inferior to the conventional packaging materials, such as polyethylene (PE). Therefore, for a biodegradable polymer to be commercialized successfully, it should be prepared through a blending process. In particular, the starch-based biodegradable polymers are widely studied due to the relatively low price of raw starch materials. However, there is quite a lot of moisture sensitivity problem for these starch-based biodegradable polymers, which in turn may affect their mechanical properties by some parameters. To better understand this behavior, nonpolar metallocene catalyzed polyolefin elastomer (mPE) was selected to blend with starch as an illustrative system for the current invention.

Furthermore, because different polymers show different properties, two kinds of polymers are often blended together to obtain a required property, which is a conventional way to produce the commercialized products. In general, the compatibility of different polymers is usually not good, thus a compatibilizer is often added to improve the compatibility of different polymers. Specifically, a clay-reinforced compatibilizer, termed nanocompatibilizer, was added to improve the interfacial strength of mPE/starch blends by exploiting the concept of nanocomposites.

In 1988, Toyota Company in Japan issued Nylon 6/clay nanocomposite patent (U.S. Pat. No. 4,739,007) at the first time. The organic alkyl ammonium was used to exchange the cations of silicate within the inorganic clay gallery, and to modify the hydrophilic clay into hydrophobic nanoclay. With the addition of modified clay during the in-situ polymerization of Nylon 6, the heat distortion temperature and mechanical properties of pristine Nylon 6 were improved significantly. Especially the above-mentioned efficacy could be reached by adding only a small amount of clay (about 3 to 5%), which was different from the conventional composite with high loading of inorganic substance (about 20%). It became the earliest commercialized nanocomposites.

Moreover, in 1992 Toyota Company cooperated with the Ube company to improve the modification technique of nanoclay. The Nylon 6 monomer, ω-caprolactam, was grafted to $Na^+$ type Montmorillonite nanoclay directly. Then it was polymerized to form the exfoliated type Nylon 6/clay nanocomposite (U.S. Pat. No. 5,102,948). The tensile strength, tensile modulus, flexural modulus and heat distortion temperature etc. were increased significantly. Additionally, the dimensional stability, gas barrier property and flame retardant property etc. were much better than those of conventional Nylon 6 composites.

To exploit the uniqueness of nanoclay, in U.S. Pat. No. 6,339,121, Rafailovich et al. used the modified nanoclay as a compatibilizer for incompatible polymers. The patent pointed out that the organic modified nanoclay could be added into polymer blends, in order to improve the compatibility between two incompatible polymers, and to develop a more homogeneous system as well. However, this kind of system must be annealed at high temperatures for a day to promote the compatibility of incompatible polymers.

Upon searching and reviewing the prior art, the patented invention of relevant technology is still insufficient, and there is little research and development on any relevant technology, so more efforts should be made in the industry in the future.

Upon assessing the technological development of the prior art, although polymer/clay nanocomposites have established a milestone for major technological development in recent years, in fact the performance/cost ratio should be considered carefully in future applications. Therefore, up to date only a few nanocomposite systems are commercialized successfully.

SUMMARY OF THE INVENTION

The foregoing features, as well as additional objects, and advantages of the invention will be more readily apparent from the following detailed description, which proceeds with reference to the accompanying drawings.

The invention mixes the modified clay and conventional compatibilizer to form the nanocompatibilizer. This kind of nanocompatibilizer can be blended with polymers directly without complicated annealing treatments. It can improve the compatibility of incompatible polymers, and further improve the drawbacks of conventional technology.

The invention utilizes the melt intercalation process to prepare the nanocompatibilizer from conventional compatibilizer and nanoclay. Taking these bio-based nanocomposites as illustrative examples, the nanocompatibilizer developed in current invention is then mixed with metallocene polyethylene (or polyethylene)/starch blends to prepare nanocomposites composed of metallocene polyethylene/starch blends or metallocene polyethylene/thermoplastic starch blends, in order to improve the compatibility and mechanical properties.

The practical applications of the invention can improve the compatibility of various polymer blends, which is especially suitable for, but not limited to, the development of environment friendly composites or biodegradable materials.

BRIEF DESCRIPTION OF THE DRAWINGS

The foregoing aspects and many of the additional advantages of this invention will be more readily appreciated, and better understood by reference to the following detailed description, when taken in conjunction with the accompanying drawings, wherein:

FIG. 10 shows the formulas and the mechanical properties of conventional blends;

FIG. 11 shows the formulas and the mechanical properties for the blends of the invention;

FIG. 12 shows the formulas and the mechanical properties of conventional blends; and FIG. 13 shows the formulas and the mechanical properties for the blends of the invention.

DESCRIPTION OF THE PREFERRED EMBODIMENT

The following is a description of the present invention. The invention firstly will be described with reference to one exemplary structure. Some variations will then be described as well as advantages of the present invention. A preferred method of fabrication will then be discussed. An alternate, asymmetric embodiment will then be described along with the variations in the process flow to fabricate this embodiment.

The invention utilizes the melt intercalation blending process. The conventional compatibilizer and nanoclay are used to prepare the nanocompatibilizer first. Then it is mixed with metallocene polyethylene (or polyethylene)/starch blends or metallocene polyethylene (or polyethylene)/thermoplastic starch blends to prepare metallocene polyethylene/starch nanocomposite or metallocene polyethylene/thermoplastic nanocomposite, in order to improve the compatibility and mechanical properties.

Figure 1:
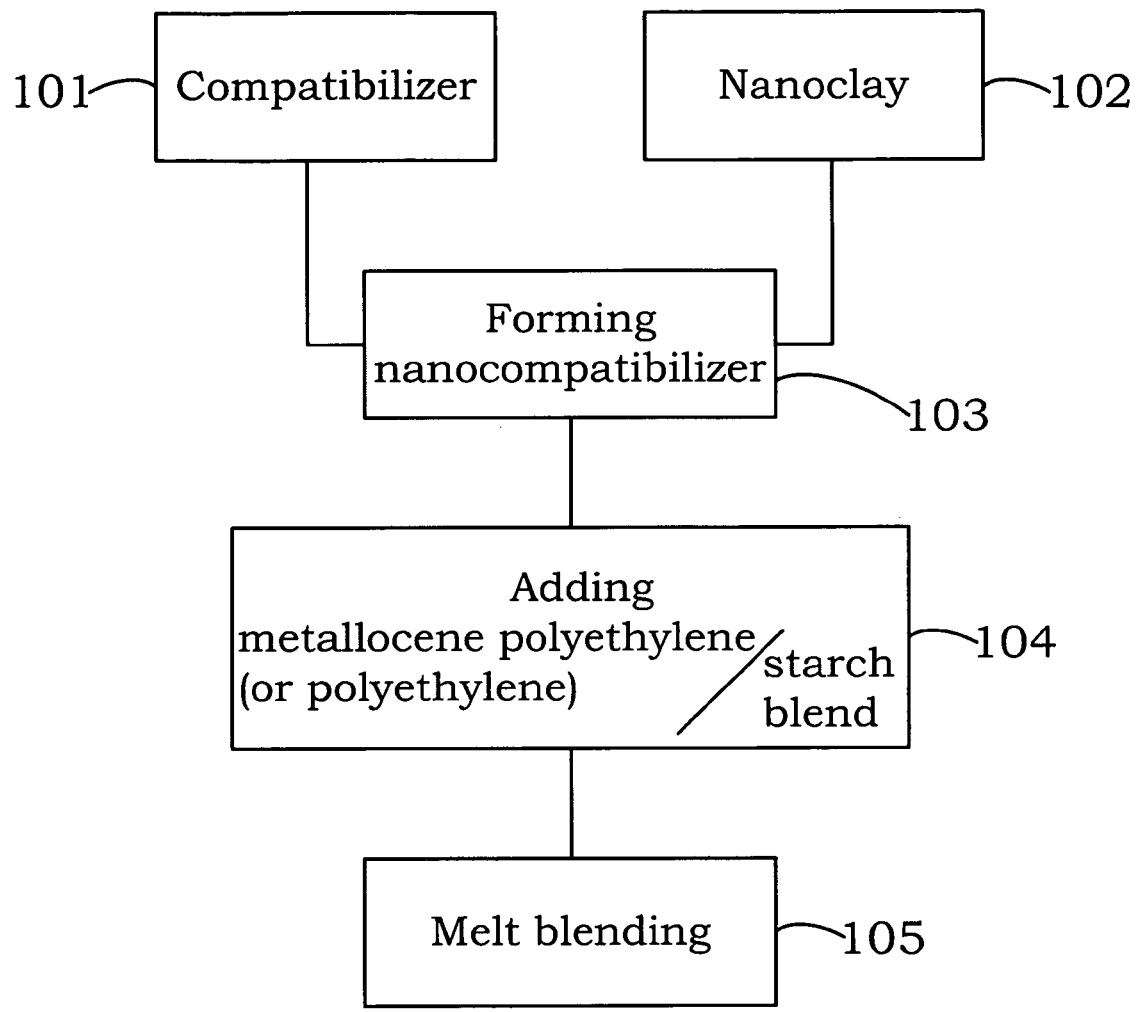
FIG. 1 is diagram schematically illustrating the first embodiment of the invention.

The detailed steps of the first embodiment of this invention are shown in FIG. 1. In FIG. 1, designating numeral 101 and designating numeral 102, the conventional compatibilizer (mPE-g-MA) 101 and nanoclay (for instance, Cloisite® 20A) 102 are provided for the embodiment of the invention.

As shown in FIG. 1, designating numeral 103, the nanocompatibilizer (mPE-g-MA/Clay) 103 is prepared by dry mixing.

Still in FIG. 1, designating numeral 104, then the metallocene polyethylene (or polyethylene)/starch blend 104 is added.

As shown in FIG. 1, designating numeral 105, the melt intercalation blending 105 is conducted. The materials are added into the blending chamber of Haake Torque Rheometer. The temperature of blending chamber is set at about 135☐ to 155☐, preferably 145☐. It is blended for 15 minutes to 25 minutes, preferably 15 minutes. The blending is completed upon cooling to the room temperature. The metallocene polyethylene/starch nanocomposite thus can be prepared in order to improve the compatibility and mechanical properties.

Figure 2:
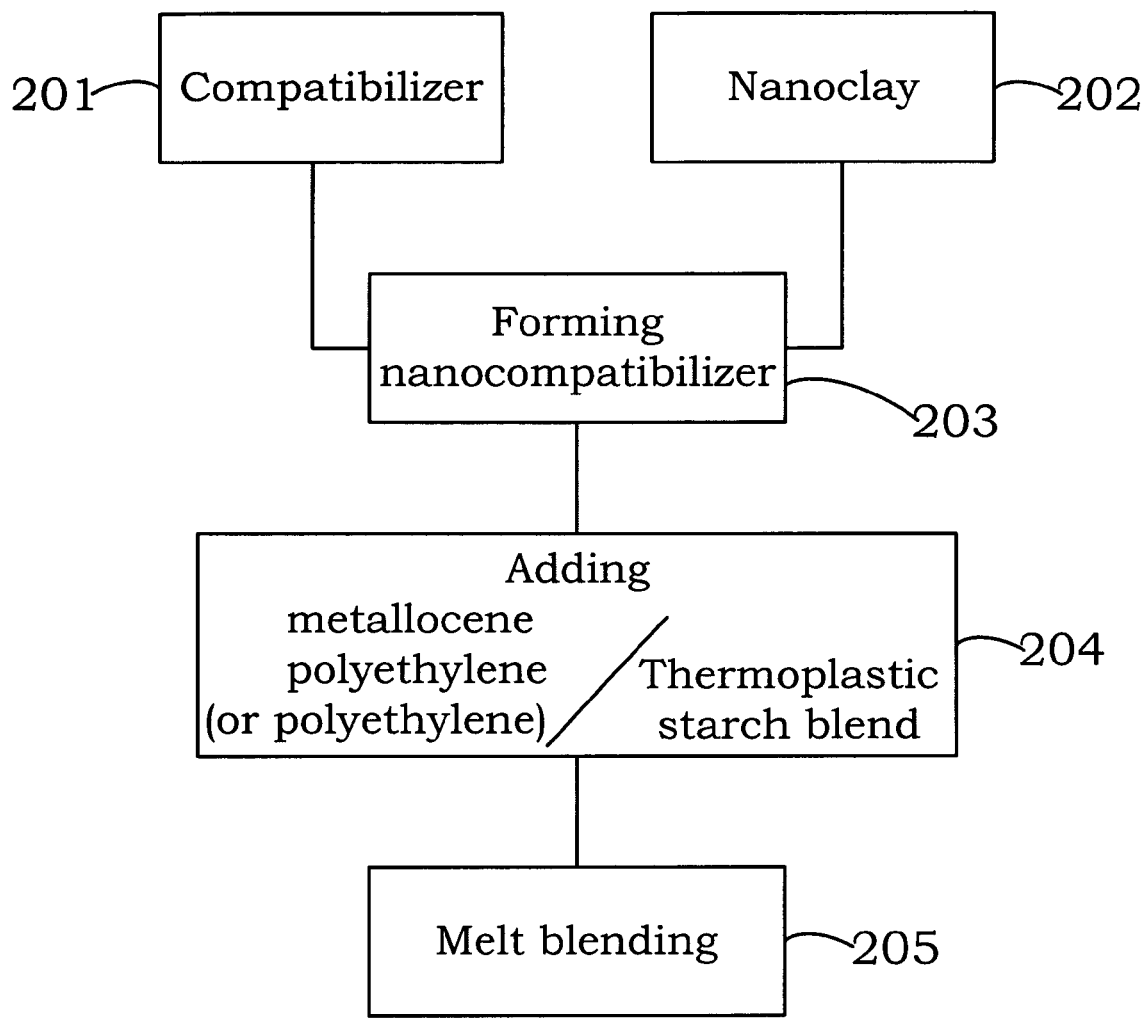
FIG. 2 is diagram schematically illustrating the second embodiment of the invention.

The detailed steps of the second embodiment of the invention are shown in FIG. 2. In FIG. 2, designating numeral 201 and designating numeral 202, the conventional compatibilizer (mPE-g-MA) 201 and nanoclay 202 are provided for the embodiment of the invention.

As shown in FIG. 2, designating numeral 203, the nanocompatibilizer (mPE-g-MA/Clay) 203 is prepared by dry mixing.

As shown in FIG. 2, designating numeral 204, then the metallocene polyethylene (or polyethylene)/thermoplastic starch (TPS) blend 204 is added.

As shown in FIG. 2, designating numeral 205, the melt intercalation blending 205 is conducted. The materials are added into the blending chamber of Haake Torque Rheometer. The temperature of blending chamber is set at about 135☐ to 155☐, preferably 145☐. It is blended for 15 minutes to 25 minutes, preferably 15 minutes. The blending is completed upon cooling to the room temperature. The metallocene polyethylene/starch nanocomposite thus can be prepared in order to improve the compatibility and mechanical properties.

Figure 3:
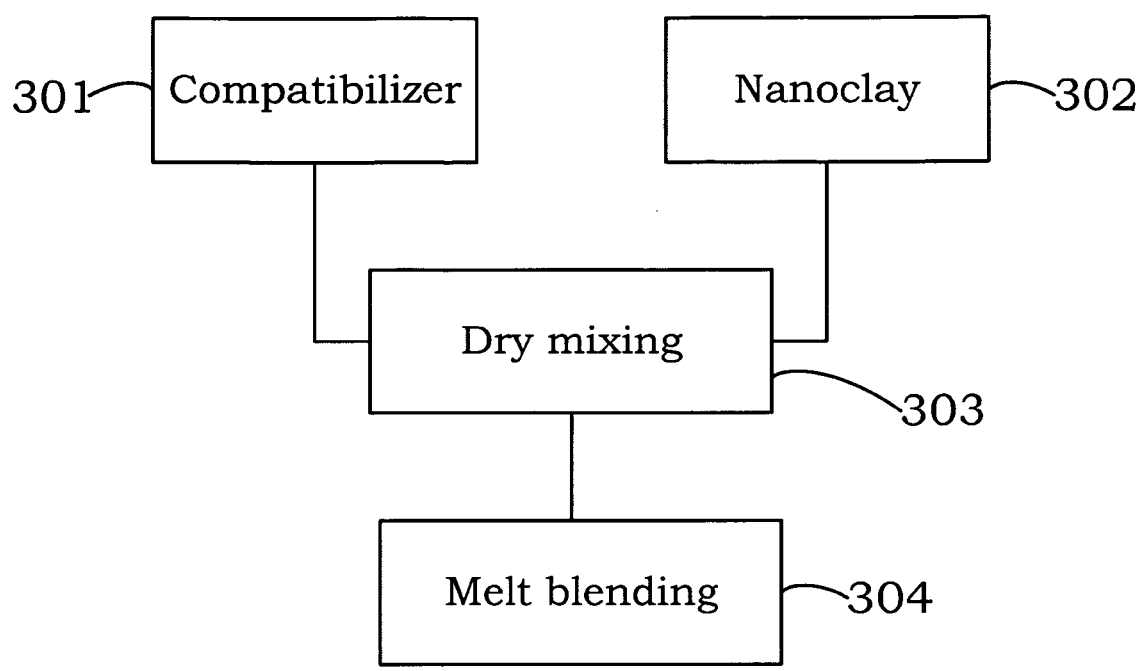
FIG. 3 is diagram schematically illustrating the formation steps for the nanocompatibilizer of the invention.
Figure 4:
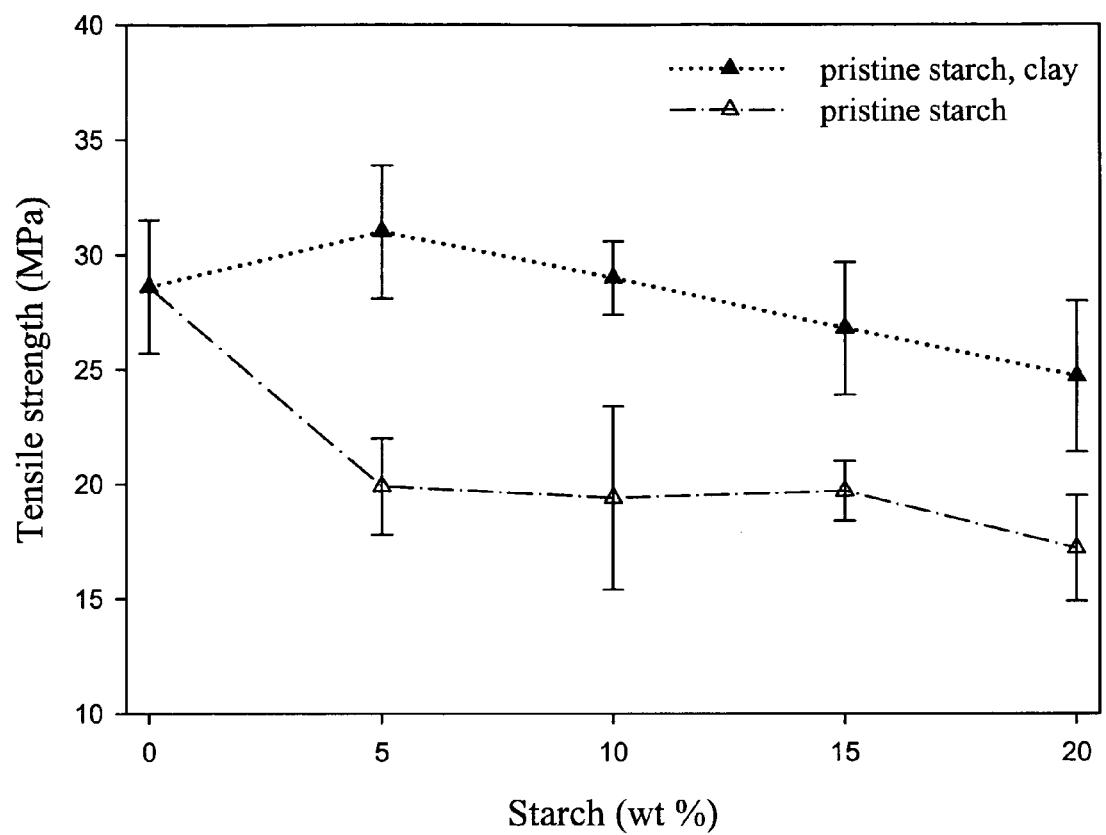
FIG. 4 is diagram schematically illustrating the test for the tensile strength of the invention.
Figure 5:
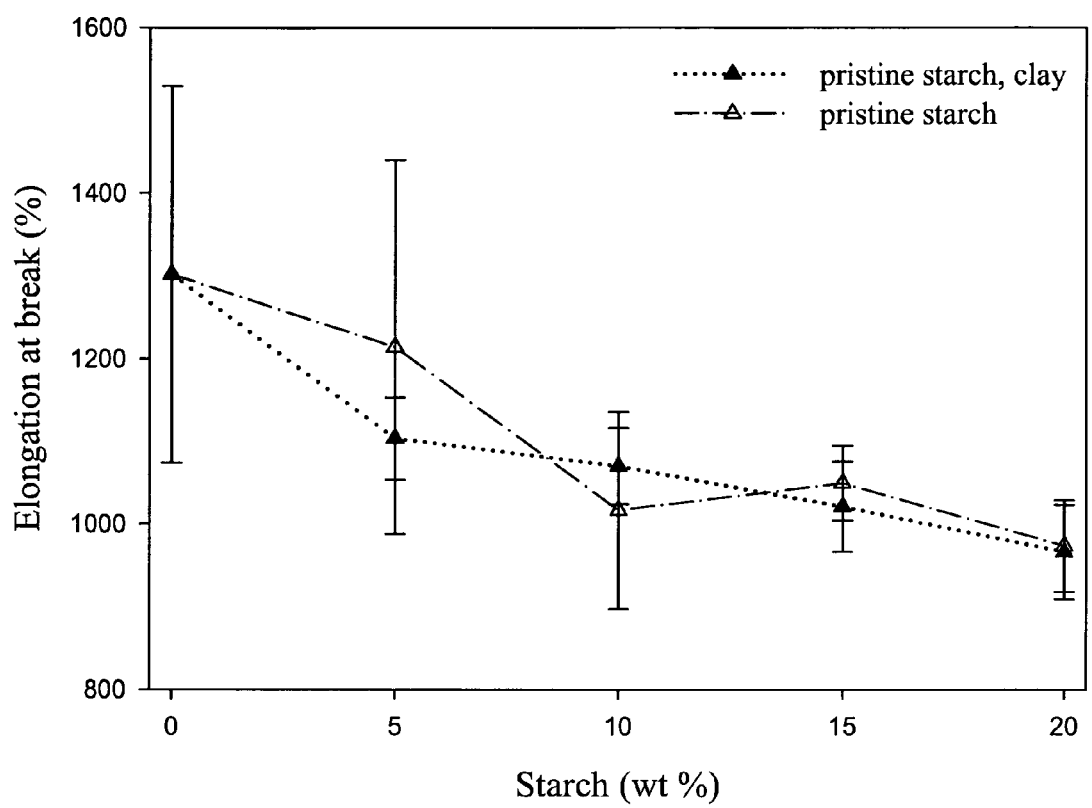
FIG. 5 is diagram schematically illustrating the test for the elongation at break of the invention.
Figure 6:
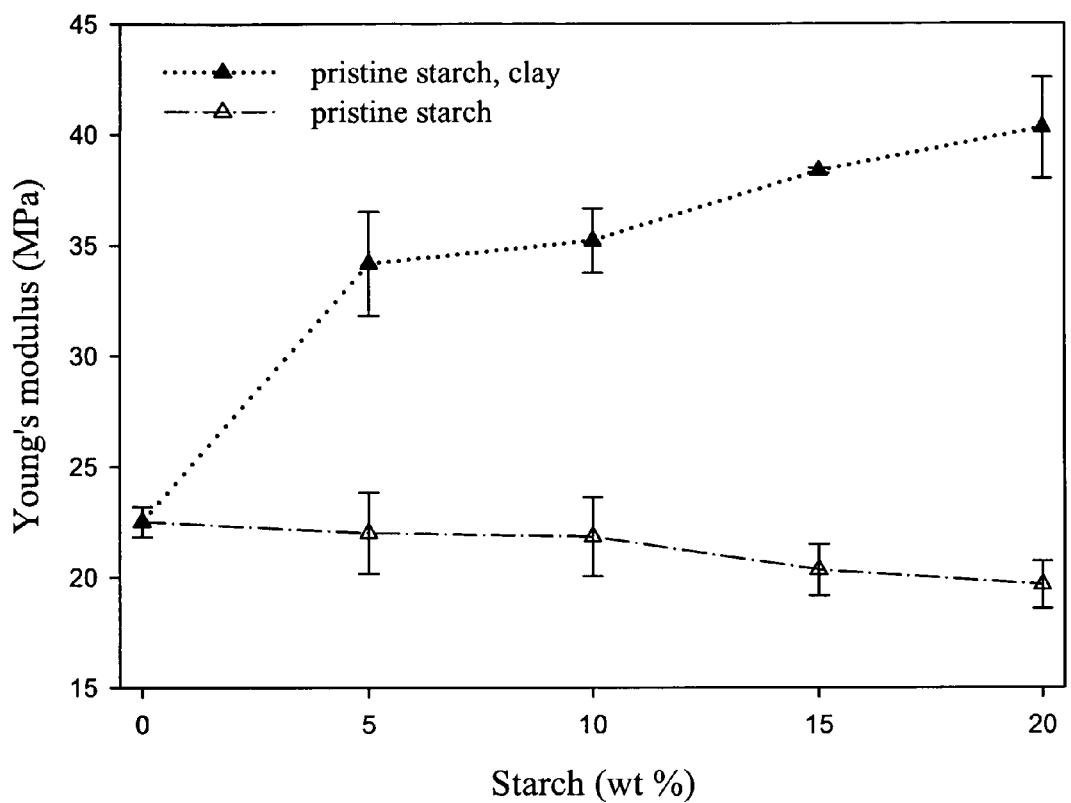
FIG. 6 is diagram schematically illustrating the test for the Young's modulus of the invention.
Figure 7:
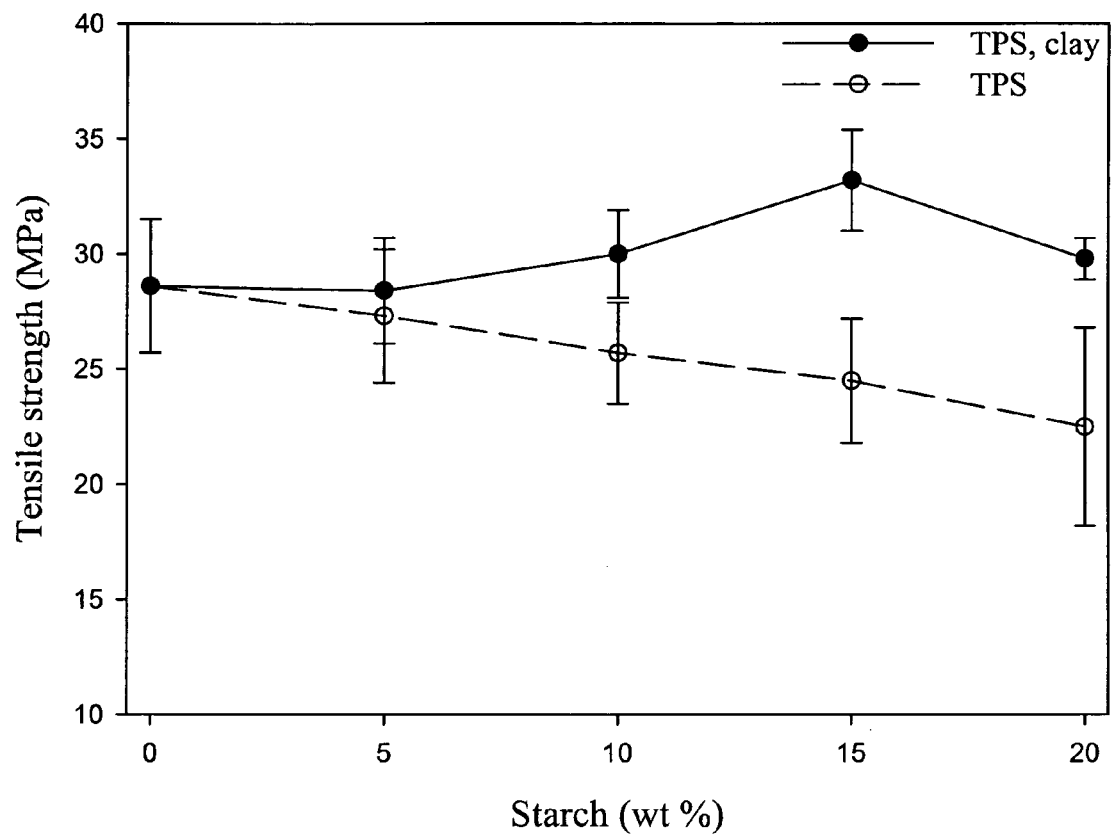
FIG. 7 is diagram schematically illustrating the test for the tensile strength of the invention.
Figure 8:
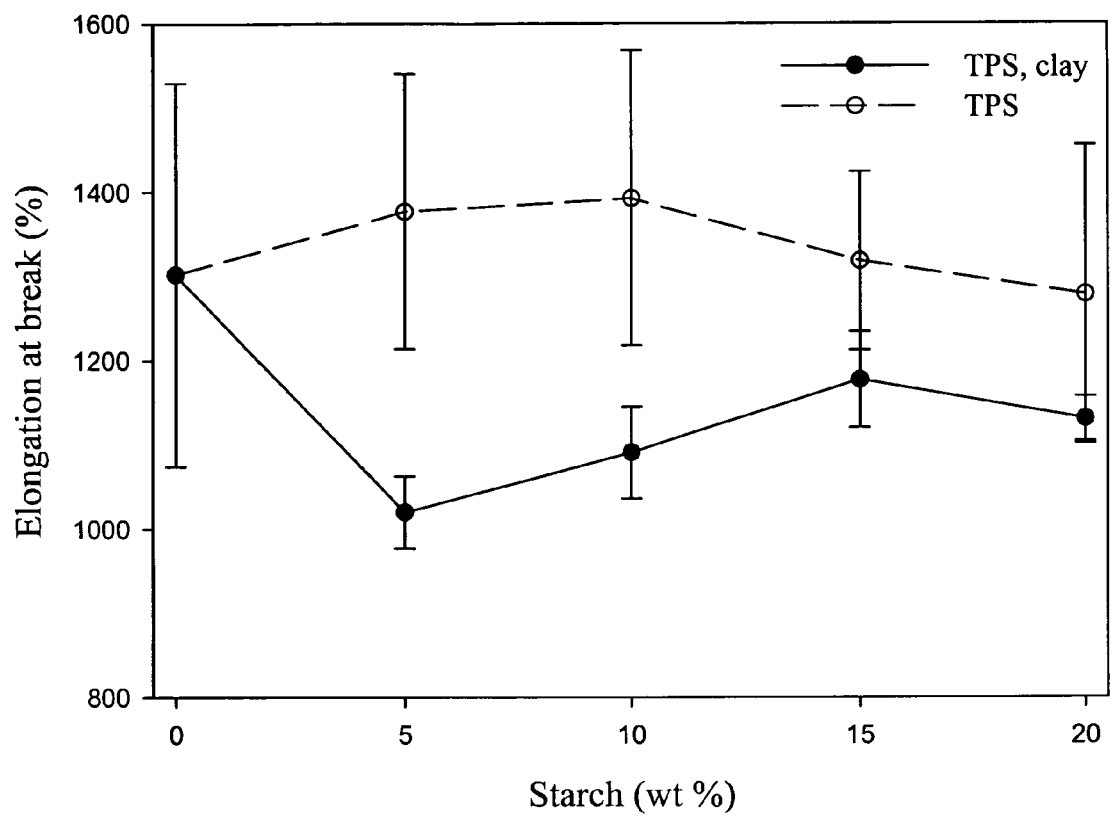
FIG. 8 is diagram schematically illustrating the test for the elongation at break of the invention.
Figure 9:
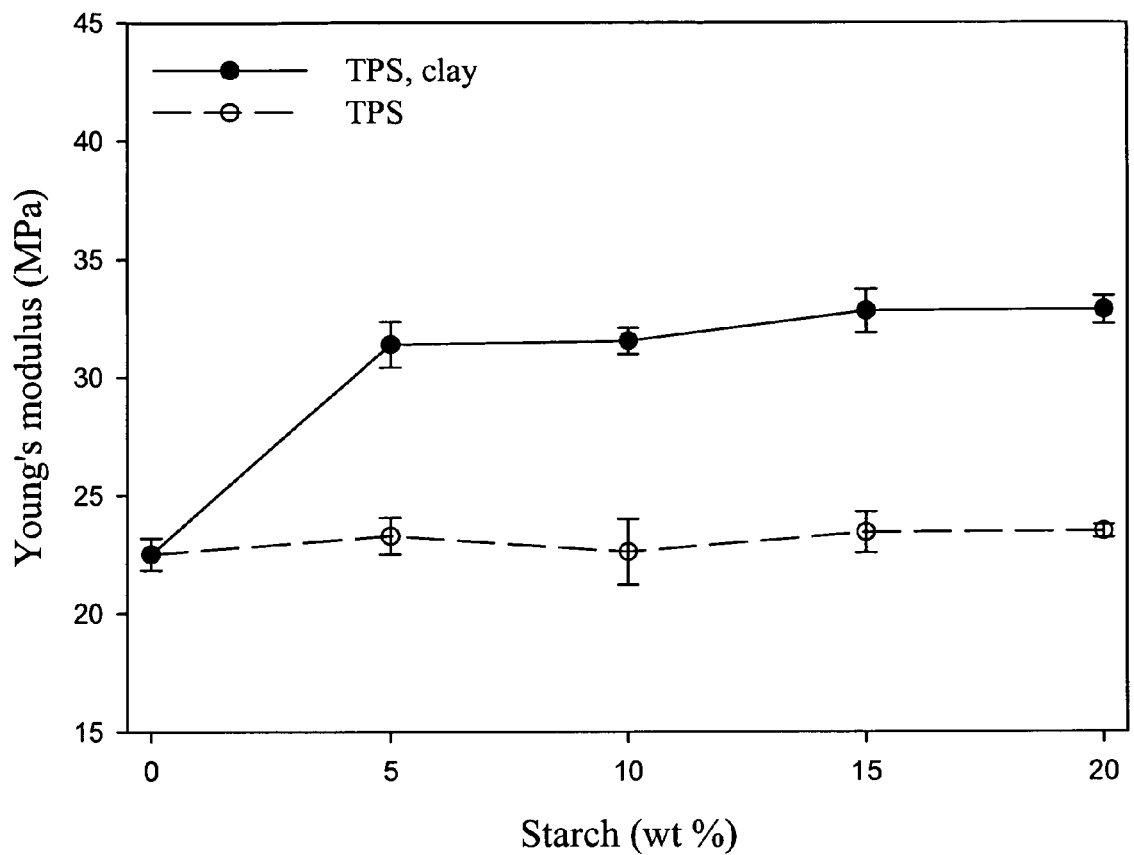
FIG. 9 is diagram schematically illustrating the test for the Young's modulus of the invention.

The detailed steps for the formation of nanocompatibilizer are shown in FIG. 3. Firstly, in FIG. 3, designating numeral 301 and designating numeral 302, the conventional compatibilizer (mPE-g-MA) 301 and commercial modified clay (Cloisite® 20A, i.e. nanoclay) 302 are provided. The content of modified clay is about 10 phr (parts per hundred resins of mPE-g-MA), which means the ratio of modified clay and compatibilizer is about 1 to 10.

Still as shown in FIG. 3, designating numeral 303, the dry mixing 303 is conducted.

As shown in FIG. 3, designating numeral 304, after the dry mixing, the materials are added into the blending chamber of Haake Torque Rheometer for the melt intercalation blending 304. The temperature of blending chamber is set at about 135° C. to 155° C., preferably 145° C. It is blended for 15 minutes to 25 minutes, preferably 15 minutes. Then, take out the blending material, followed by cooling down to the room temperature to complete the blending process and form the nanocompatibilizer.

The nanocomposites of the invention consist of the following ingredients: nanoclay, nanocompatibilizer (mPE-g-MA/Clay), metallocene polyethylene (mPE) or polyethylene (PE), compatibilizer (mPE-g-MA), corn starch, and glycerol. Wherein, the content of modified clay is 1 phr to 5 phr of the whole system. The addition amount of nanocompatibilizer is about 5 phr to 20 phr. The addition amount of metallocene polyethylene is about 70% to 95%. The addition amount of corn starch is about 5% to 30%. The amount of glycerol shall be 10% to 20%. The amount of deionized water shall be 30% to 40%.

The invention utilizes nonpolar metallocene polyethylene as main substrate to reduce the influence of moisture effect.

The thermoplastic starch (TPS) of the invention is made up of corn starch, glycerol, and water. After the dry mixing, the materials are added into the blending chamber of Haake Torque Rheometer for the melt blending process. They are blended at 90☐ for 30 minutes. Take out the blending materials, followed by cooling down to the room temperature. In the kind of thermoplastic starch, the content of glycerol is 10% to 20%, preferably 20%. The content of water is 30% to 40%, preferably 30%.

Finally, the test plates prepared by different formulas are tested in accordance with the test condition of ASTM D-638 standard, in order to measure the mechanical properties. Tables 1 to 4 and FIGS. 4 to 9 show the formulas of all samples and the measuring results of mechanical properties.

According to FIGS. 4, 5, and 6, and FIGS. 10 and 11, the results show that the Young's modulus and tensile strength of nanocompatibilizer system are higher than those of conventional compatibilizer system, wherein the improvement effect on Young's modulus is the most significant, and the change of elongation at break is not significant.

Upon increasing the content of starch, even though the conventional compatibilizer is used, the Young's modulus of blend is not increased. When the nanocompatibilizer of the invention is added instead, the Young's modulus of blend is increased effectively.

According to FIGS. 12 and 13 and FIGS. 7, 8, and 9, the results suggest that the thermoplastic starch is apt to induce the esterification reaction with conventional compatibilizer, which increases the interface affinity with the metallocene polyethylene, so that the elongation at break of samples is increased. The maximum value is attained at 5 to 10 wt % of thermoplastic starch.

It is found that after the conventional compatibilizer is replaced with the nanocompatibilizer, when the content of thermoplastic starch is increased, the tensile strength, elongation at break and Young's modulus is increased slightly. It shall also be noted that the Young's modulus and tensile strength of nanocompatibilizer-included system are higher than those of conventional compatibilizer-included system, which shows that the addition of nanocompatibilizer can improve the mechanical properties of the blends.

As for the improvement of mechanical properties, the main reason is that the nanoparticles of modified nanoclay is dispersed mainly at the interface between metallocene polyethylene matrix and metallocene polyethylene/starch interface. And the nanoclay is used to reinforce conventional compatibilizer, in order to increase the interface strength between the metallocene polyethylene matrix and starch filler.

The nanocompatibilizer of the invention can be blended with polymers directly without annealing treatments. It can improve the compatibility of incompatible polymer blends, and further improve the drawbacks of conventional technology.

The application of nanocompatibilizer of the invention is not limited to the above-mentioned environment friendly composites. It can be used in any incompatible polymer blends to increase the compatibility.

It is understood that other various modifications will be apparent to and can be readily made by those skills in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skills in the art to which this invention pertains.

TABLE 1

| Sample code | 05% | 10% | 15% | 20% |
|---|---|---|---|---|
| mPE (%) | 95 | 90 | 85 | 80 |
| Pristine starch (%) | 05 | 10 | 15 | 20 |
| mPE-g-MA (phr) | 10 | 10 | 10 | 10 |
| Tensile strength (MPa) | 19.9 ± 2.1 | 19.4 ± 4.0 | 19.7 ± 1.3 | 17.2 ± 2.3 |
| Elongation at break (%) | 1213.9 ± 226.1 | 1016.6 ± 119.5 | 1049.6 ± 45.4 | 973.6 ± 55.4 |
| Young's modulus (MPa) | 22.0 ± 1.8 | 21.8 ± 1.8 | 20.3 ± 1.2 | 19.7 ± 1.1 |

TABLE 2

| Sample code | 05% | 10% | 15% | 20% |
|---|---|---|---|---|
| mPE (%) | 95 | 90 | 85 | 80 |
| Pristine starch (%) | 05 | 10 | 15 | 20 |
| mPE-g-MA (phr) | 10 | 10 | 10 | 10 |
| Clay (phr) | 1 | 1 | 1 | 1 |
| Tensile strength (MPa) | 31.0 ± 2.9 | 29.0 ± 1.6 | 26.8 ± 2.9 | 24.7 ± 3.3 |
| Elongation at break (%) | 1103.3 ± 49.9 | 1070.1 ± 46.3 | 1021.0 ± 54.8 | 966.3 ± 56.9 |
| Young's modulus (MPa) | 34.2 ± 2.4 | 35.2 ± 1.5 | 38.4 ± 0.1 | 40.3 ± 2.3 |

TABLE 3

| Sample code | 05% | 10% | 15% | 20% |
|---|---|---|---|---|
| mPE (%) | 95 | 90 | 85 | 80 |
| TPS (%) | 05 | 10 | 15 | 20 |
| mPE-g-MA (phr) | 10 | 10 | 10 | 10 |
| Tensile strength (MPa) | 27.3 ± 2.9 | 25.7 ± 2.2 | 24.5 ± 2.7 | 22.5 ± 4.3 |
| Elongation at break (%) | 1377.1 ± 163.2 | 1392.8 ± 175.2 | 1318.4 ± 106.0 | 1278.9 ± 177.2 |
| Young's modulus (MPa) | 23.3 ± 0.8 | 22.6 ± 1.4 | 23.4 ± 0.9 | 23.5 ± 0.3 |

TABLE 4

| Sample code | 05% | 10% | 15% | 20% |
|---|---|---|---|---|
| mPE (%) | 95 | 90 | 85 | 80 |
| TPS (%) | 05 | 10 | 15 | 20 |
| mPE-g-MA (phr) | 10 | 10 | 10 | 10 |
| Clay (phr) | 1 | 1 | 1 | 1 |
| Tensile strength (MPa) | 28.4 ± 2.3 | 30.0 ± 1.9 | 33.2 ± 2.2 | 29.8 ± 0.9 |

TABLE 4-continued

| Sample code | 05% | 10% | 15% | 20% |
|---|---|---|---|---|
| Elongation at break (%) | 1019.9 ± 42.9 | 1090.7 ± 54.6 | 1177.2 ± 56.8 | 1130.9 ± 26.4 |
| Young's modulus (MPa) | 31.4 ± 1.0 | 31.5 ± 0.6 | 32.8 ± 0.9 | 32.9 ± 0.6 |

What is claimed is:

1. A method for forming polymer blend nanocomposites, comprising:
   providing a compatibilizer and a nanoclay;
   dry mixing the compatibilizer and the nanoclay;
   adding the compatibilizer and the nanoclay to a polyethylene/starch blend; and
   blending the polyethylene/starch blend, the compatibilizer and the nanoclay to form a metallocene polyethylene/starch nanocomposite.

2. The method according to claim 1, wherein the polyethylene/starch blend types are selected from the group consisting essentially of: polyethylene/starch blend, polyethylene/thermoplastic starch blend, metallocene polyethylene/starch blend, and metallocene polyethylene/thermoplastic starch blend.

3. The method according to claim 1, wherein the blending comprises the melt intercalation blending process.

4. The method according to claim 1, wherein the blending temperature is about from 135° C. to 155° C.

5. The method according to claim 1, wherein the blending time is about from 15 minutes to 25 minutes.

6. The method according to claim 1, wherein the polyethylene polyethylene/starch blend types are selected from the group consisting of: polyethylene/starch blend, polyethylene/thermoplastic starch blend, metallocene polyethylene/starch blend, and metallocene polyethylene/thermoplastic starch blend.

* * * * *